United States Patent
Lehrmann et al.

(10) Patent No.: US 10,163,036 B2
(45) Date of Patent: Dec. 25, 2018

(54) SYSTEM AND METHOD OF ANALYZING IMAGES USING A HIERARCHICAL SET OF MODELS

(71) Applicant: DISNEY ENTERPRISES, INC., Burbank, CA (US)

(72) Inventors: Andreas Lehrmann, Burbank, CA (US); Leonid Sigal, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 120 days.

(21) Appl. No.: 15/273,176

(22) Filed: Sep. 22, 2016

(65) Prior Publication Data

US 2017/0300781 A1 Oct. 19, 2017

Related U.S. Application Data

(60) Provisional application No. 62/322,759, filed on Apr. 14, 2016.

(51) Int. Cl.
| | |
|---|---|
| *G06K 9/00* | (2006.01) |
| *G06K 9/62* | (2006.01) |
| *G06K 9/46* | (2006.01) |
| *G06K 9/66* | (2006.01) |

(52) U.S. Cl.
CPC .......... *G06K 9/6217* (2013.01); *G06K 9/46* (2013.01); *G06K 9/6267* (2013.01); *G06K 9/66* (2013.01)

(58) Field of Classification Search
CPC .......... G06K 9/6217; G06K 9/66; G06K 9/46; G06K 9/6267; G06K 9/6296; G06K 9/6261; G06K 9/6219; G06K 9/6288
USPC ....... 382/100, 181, 185, 118, 164, 173, 103, 382/182, 186, 187, 203, 224
See application file for complete search history.

(56) References Cited

U.S. PATENT DOCUMENTS

| | | | |
|---|---|---|---|
| 8,180,146 B2 * | 5/2012 | Ngan | G06K 9/4671 382/153 |
| 8,755,604 B1 * | 6/2014 | Gross | G06K 9/72 382/181 |
| 8,775,604 B2 * | 7/2014 | Levow | H04L 29/12066 709/206 |
| 9,129,148 B1 * | 9/2015 | Li | G06K 9/00268 |
| 9,275,269 B1 * | 3/2016 | Li | G06K 9/00268 |
| 9,529,898 B2 * | 12/2016 | Epstein | G06F 17/30707 |

* cited by examiner

*Primary Examiner* — Sheela C Chawan
(74) *Attorney, Agent, or Firm* — Sheppard Mullin Richter & Hampton LLP

(57) ABSTRACT

One or more image parameters of an image may be analyzed using a hierarchical set of models. Executing individual models in the set of models may generate outputs from analysis of different image parameters of the image. Inputs of one or more of the models may be conditioned on a set of outputs derived from one or more preceding model in the hierarchy.

22 Claims, 4 Drawing Sheets

SYSTEM AND METHOD OF ANALYZING IMAGES USING A HIERARCHICAL SET OF MODELS

FIELD OF THE DISCLOSURE

This disclosure relates to analyzing images using a hierarchical set of models.

BACKGROUND

Understanding a visual scene portrayed in an image may employ techniques including one or more of detecting scene features, recognizing objects from the detected features (e.g., identifying, categorizing, and/or other techniques for object recognition), determining locations of objects within the scene, and/or determining other information associated with the scene. Contextual models for understanding a scene may attempt to build various models of various forms for recognition. A simplest among those may look at label co-occurrence or exclusion among object categories in a given image. Others may look at enhancement or inhibition of detections using both co-occurrence and spatial local contextual relations, for example, through the use of structured image labeling, visual phrases, or discovered object groups, and/or to order detectors such that weaker detectors may benefit from stronger ones. Some models may look at context across granularities, for example, using texture patches to enhance performance of object detectors.

SUMMARY

One aspect of the disclosure relates to a system configured for analyzing images using a hierarchical set of models. One or more of the models may be conditioned on a set of outputs derived from one or more preceding models such that output from an individual model may require execution of a limited set of the models. By way of non-limiting illustration, for a set of "N" models, output form an "n-th" model may require execution of models 1 to n, but not n+1 to N.

In some implementations, the system may include one or more physical processors configured by machine-readable instructions. Executing the machine-readable instructions may cause the one or more physical processors to facilitate analyzing images using the hierarchical set of models. The machine-readable instructions may include one or more of an image component, an analysis component, a user input component, a results component, and/or other components.

The image component may be configured to obtain individual images and/or other information. Individual images may be defined by image information and/or other information. Image information may comprise visual information and/or other information that may be related to and/or otherwise define a scene portrayed in a given image. A scene may include one or more objects and/or other components of a scene. In some implementations, visual information may comprise one or more of information defining pixels of an individual image, and/or other information.

The analysis component may be configured to analyze an image by executing individual models in the hierarchical set of models. Executing the individual models in the set of models may generate outputs from analysis of different image parameters of the image. Inputs of one or more of the models may be solely conditioned on a set of outputs derived from a preceding model. In some implementation, individual models may obtain the image information.

By way of non-limiting example, a set of models may comprise one or more of a first model, a second model, a third model, and/or other models. The first model may be configured to generate outputs from analysis of a first image parameter and/or other image parameters. The generation of outputs by the first model may be independent from any outputs of the second model, third model, and/or other models. The second model may be configured to generate outputs from analysis of a second image parameter and/or other image parameters. In some implementations, the execution of the second model may be conditioned on outputs of the first model and/or other models. The third model may be configured to generate outputs from analysis of a third image parameter and/or other image parameters. In some implementations, execution of the third model may be conditioned on outputs of the second model and/or other models. In some implementations, relationships between models in the set of models may be one or more of linear, tree structured, and/or other relationships.

The user input component may be configured to perform one or more of effectuating presentation of user interfaces on computing platforms associated with users, obtaining user selection of desired one or more image parameters to analyze within an image, obtain other user input based on user interaction with a user interface, and/or perform other operations. In some implementations, based on the user selection of one or more image parameters, the analysis component may be configured to execute a limited set of the models that may correspond to a user selection. By way of non-limiting example, responsive to the user input component obtaining user selection of the second image parameter, the analysis component may be configured to execute the first model and the second model. The user input component may be configured to effectuate output of an executed limited set of models on a user interface. By way of non-limiting illustration, output of execution of the first model and second model may be effectuated independent from execution of the third model and/or other models.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
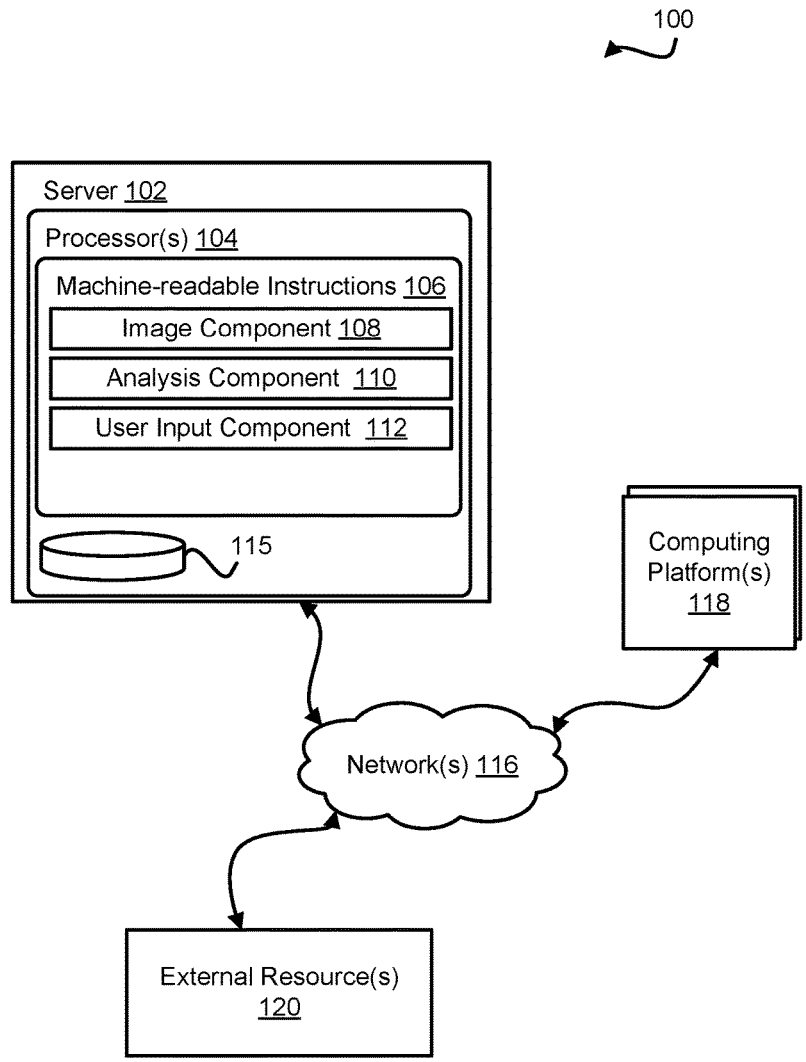
FIG. 1 illustrates a system configured for analyzing images using a hierarchical set of models, in accordance with one or more implementations.

FIG. 1 illustrates a system 100 configured for analyzing images using a hierarchical set of models, in accordance with one or more implementations. The hierarchical set of models may be configured such that individual models may be selectively executed without execution of the entire set of models. One or more of the models may be conditioned on a set of outputs derived from one or more preceding models such that output from an individual model may only require execution of a limited set of the models.

In some implementations, system 100 may comprise a server 102, one or more computing platforms 118, and/or other components. The server 102 may include one or more physical processors 104 configured by machine-readable instructions 106. Executing the machine-readable instructions 106 may cause the one or more physical processors 104 to facilitate analyzing images using the hierarchical set of models. The machine-readable instructions 106 may include one or more of an image component 108, an analysis component 110, a user input component 112, and/or other components.

In some implementations, server 102 may be configured to provide remote hosting of the features and/or function of machine-readable instructions 106 to one or more computing platforms 118 that may be remotely located from the server 102. However, in some implementations, one or more features and/or functions of server 102 may be attributed as local features and/or functions of one or more computing platforms 118. By way of non-limiting example, individual ones of the computing platforms 118 may include machine-readable instructions (not shown in FIG. 1) comprising the same or similar components as machine-readable instructions 106 of server 102. The computing platforms 118 may be configured to locally execute the one or more components that may be the same or similar to the machine-readable instructions 106. By way of non-limiting example, one or more features and/or functions of machine-readable instructions 106 of server 102 may be provided, at least in part, as an application program that may be executed at a given client computing platform 118.

The computing platforms 118 may include one or more of a cellular telephone, a smartphone, a digital camera, a laptop, a tablet computer, a desktop computer, a television set-top box, smart TV, a client device, a gaming console, and/or other platforms.

In some implementations, image component 108 may be configured to obtain individual images and/or other information. Individual images may be defined by image information and/or other information. Image information may comprise visual information and/or other information that may be related to and/or otherwise define a scene portrayed in an image. By way of non-limiting example, visual information may comprise one or more of information defining pixels of an individual image, and/or other information. By way of non-limiting example, information related to individual pixels of an image may comprise one or more of a position and/or orientation of the individual pixels, a color of the individual pixels, a luminous intensity of the individual pixels, and/or other information. For purposes of simplicity and clarity, one or more references to an "image" may herein also refer to the "image information" that may define the image.

In some implementations, image component 108 may be configured to obtain images from one or more storage locations. An image storage location may comprise one or more of electronic storage 115 that may be locally assessable to server 102 and/or processor(s) 104, a computing platform 118, an external resource 120, and/or other storage locations.

In some implementations, image component 108 may be configured to obtain images responsive to one or more requests to analyze images. In some implementations, a given request may be associated with one or more of a user, an entity that is external to system 100, an entity that is internal to system 100, and/or other sources of requests. By way of non-limiting example, a user request may be associated with user input provided via a user interface (see, e.g., FIG. 3) presented on a computing platform 118. User input may comprise entry and/or selection of one or more of a stored image (e.g., via entry and/or selection of a name, a description, a thumbnail, a serial number, and/or other information that may identify a stored image), a storage location of image information of an image (e.g., a network location, web address, computing platform identification such as a MAC address, and/or other information specifying a storage location of image information), and/or other inputs that may specify images for which analysis may be desired. In some implementations, a user request may be associated with an upload of image information to server 102 (e.g., image component 108) via a computing platform 118.

In some implementations, one or more entities that may request analysis of one or more images may include one or more of an application, a program, a system, a computing platform, and/or other entity that may be external and/or internal to system 100.

The analysis component 110 may be configured to perform analysis of one or more images (e.g., analysis of image information of individual images). Analysis may comprise execution of one or more of the individual models in a hierarchical set of models. Individual models in the set of models may be configured to generate outputs from analysis of one or more image parameters. In some implementations, individual models may be configured to generate outputs from analysis of different ones of the image parameters. Outputs from analysis of an image parameter may comprise parameter values of image parameters, and/or other outputs. In some implementations, a hierarchy of individual models within the set of models may be established based on inputs of one or more of the individual models being solely conditioned on a complete set of outputs derived from one or more preceding models.

Figure 2:
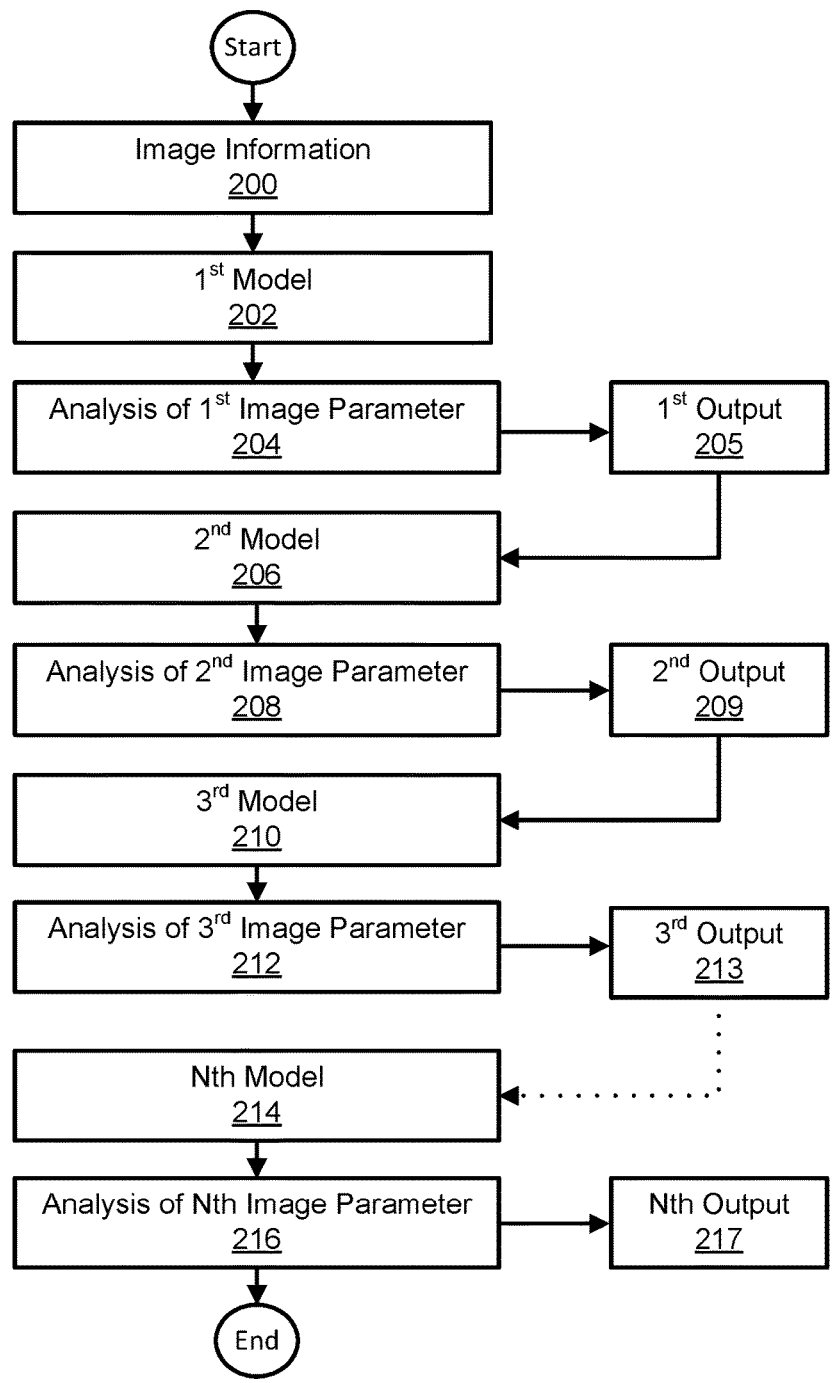
FIG. 2 illustrates an exemplary visual representation of a hierarchical set of models used for analyzing images.

By way of non-limiting illustration, FIG. 2 illustrates an exemplary visual representation a hierarchical set of models. The set of models may include one or more of a first model 202, a second model 206, a third model 210, and/or other models. By way of non-limiting example, other models may include one or more models up to an N-th model 214 as shown in the figure. It is noted that current depiction is for illustrative purposes only and not to be considered limiting. For example, in some implementations, the set of models may be include more or fewer than those currently depicted.

The first model 202 may represent a hierarchically first occurring model. In some implementations, input into the first model 202 may comprise image information 200 and/or other information. The first model 202 may be associated with analysis of a first image parameter 204 and/or other image parameters. Execution of the first model 202 may generate first output 205 from the analysis of the first image parameter 204 and/or other image parameters. By way of non-limiting example, first output 205 may comprise one or more parameter values of the first image parameter 204, and/or other outputs.

The second model 206 may represent a hierarchically second occurring model. In some implementations, input into the second model 206 may comprise the first output 205 derived from the execution of the first model 202. The second model 206 may be associated with analysis of a second image parameter 208 and/or other image parameters. Execution of the second model 206 may generate second output 209 from the analysis of the second image parameter 208 and/or other image parameters. By way of non-limiting example, second output 209 may comprise one or more parameter values of the second image parameter 208, and/or other outputs.

The third model 210 may represent a hierarchically third occurring model. In some implementations, input into the third model 210 may comprise the second output 209 derived from the execution of the second model 206. The third model 210 may be associated with analysis of a third image parameter 212 and/or other image parameters. Execution of the third model 210 may generate third output 213 from the analysis of the third image parameter 212 and/or other image parameters. By way of non-limiting example, third output 213 may comprise one or more parameter values of the third image parameter 212, and/or other outputs.

The N-th model 214 may represent a hierarchically last occurring model. In some implementations, input into the N-th model 214 may comprise output derived from execution of a preceding model. By way of non-limiting example, input into the N-th model 214 may comprise output derived from the execution of the third model 206, and/or other model that may occur after the third model 206 and preceding the N-th model 214. The N-th model 214 may be associated with analysis of an N-th image parameter 216 and/or other image parameters. Execution of the N-th model 214 may generate N-th output 217 from the analysis of the N-th image parameter 216 and/or other image parameters. By way of non-limiting example, N-th output 217 may comprise one or more parameter values of the N-th image parameter 216, and/or other outputs.

In some implementations, image parameters may include one or more of a feature parameter, an object occurrence parameter, a location parameter, an object articulation parameter, an object segmentation parameter, an object flow parameter, an object action parameter, and/or other image parameters.

Parameter values of a feature parameter may comprise information associated with detection of one or more of feature points, continuous curves, regions, objects and/or other feature detections within an image. A model configured to generate output comprising parameter values of a feature parameter may be configured to execute one or more feature detection operations. By way of non-limiting example, a feature detection operation may include one or more of bounding box parameterization, convolutional neural network parameterization, and/or other feature detection operations. In some implementations, an object may be represented by a discriminative numerical representation of an image patch containing the object, and/or other information.

Parameter values of an object occurrence parameter may comprise one or more of object identifications, object category determinations, and/or other information. A model configured to generate output comprising parameter values of an object occurrence parameter may be conditioned on outputs of one or more preceding models. By way of non-limiting example, a model configured to generate output comprising parameter values of an object occurrence parameter may be conditioned on a set of outputs from a preceding model configured to generate output comprising parameter values of a feature parameter and/or other image parameters.

In some implementations, a model configured to generate output comprising parameter values of an object occurrence parameter may be configured to execute one or more or an object identification operation, object categorization operation, and/or other operations.

An object identification operation may be configured to identify individual feature points, continuous curves, regions, and/or objects detected by one or more preceding models. By way of non-limiting example, detected objects and/or regions may be identified as a particular object within an image based on one or more of size, shape, form, color, contextual information, and/or other identifying information. In some implementations an object identification operation may employ one or more object identification and/or recognition techniques. Such techniques may include one or more of edge matching, greyscale matching, gradient matching, interpretation trees, pose consistency, pose clustering, optical character recognition, template matching, Scale-invariant feature transform (SIFT), Speeded Up Robust Features (SURF), histogram of oriented gradients (HOG), convolutional neural networks (CNN), and/or other techniques.

An object categorization operation may be configured to determine one or more of object categories associated with individual ones of the identified objects, a quantity of instances of individual object categories, and/or provide other output. In some implementations, object categories may be associated with a set of objects having one or more similarities. By way of non-limiting example, similarities may include one or more of a same or similar use, a same or similar disposition within an environment, a same or similar function, a same or similar shape and/or form, and/or other similarities.

By way of non-limiting example, a first object, a second object, and/or other objects may have one or more similarities and/or commonalities. The first object, second object, and/or other objects may be classified under a first object category. For example, the first object may be a desktop computer and the second object may be a desk. The first object category may be "an office," and/or other object category.

It is noted that the above "office" example is provided for illustrative purposes only and is not to be considered limiting. In some implementations, other object categories may be considered that may be associated with other sets of objects sharing one or more similarities.

In some implementations, object categories may be defined by one or more of a user, machine learning techniques, and/or other categorization techniques. By way of non-limiting example, one or more object categories may be learned and/or predetermined prior to execution of a model configured to generate output comprising parameter values of an object occurrence parameter.

In some implementations, objects and/or object categories may be associated with contextual information and/or other information. Contextual information may include one or more of conditional likelihood of presence of individual objects, spatial dependencies between objects, and/or other information. In some implementations, contextual information may aid in identifying objects and/or in other operations.

By way of non-limiting example, based on a likelihood that an object may be present with a currently identified object, one or more iterations of an object identification operation may be performed to "check" whether the object may indeed also be present in an image. That is, an object identification operation may "look" for certain objects given their likelihood of being present with one or more other identified objects.

In some implementations, conditional likelihood of presence of individual objects may be determined from training data and/or other information. Training data may comprise a set of image exemplars that may include known and/or learned object identifications and/or categorizations. Conditional likelihoods for co-occurrences of exemplary objects may be determined through analysis of the image exemplars.

By way of non-limiting illustration, training data may include a set of image exemplars that may depict one or more of a first object, a second object, and/or other objects. By analyzing the set of image exemplars, a likelihood of co-occurrence of the first object, second object, and/or other objects may be determined. For example, based on a threshold quantity of the one or more image exemplars in the set of image exemplars that depict a co-occurrence of the first object, second object, and/or other objects, a likelihood of co-occurrence of the first object, second object, and/or other objects may be determined.

By way of non-limiting illustration, a set of image exemplars may include images of desktop computers within various environments. For example, desktop computers may likely be present in an office setting. It may be common for desktop computers to also appear next to desks, chairs, lamps, and/or other objects that may be within an office setting. The set of image exemplars may also include images depicting desktop computers in other settings, such as in a dumpster and/or other environments. However, occurrence of images portraying desktop computers in the dumpster may be relatively less than being portrayed in an office setting. As such, it may be determined that desktop computers may be more likely to be present with desks, chairs, lamps, and/or other objects within an office setting than with a dumpster.

In some implementations, likelihood may be expressed by one or more of numerically, descriptively, graphically, and/or other expressions. A numerical likelihood may include one or more of a percentage, a sliding scale value (e.g., with one end of the scale represented no likelihood while another end of the scale may represented a high likelihood), and/or other numerical representation. A descriptive likelihood may include one or more of "highly likely," "moderately likely," "unlikely," and/or other representations.

In some implementations, an object categorization operation may employ a Bayesian network (herein referred to as the occurrence network) to determine one or both of the presence/absence of object categories and/or a quantity of individual object categories instances, and/or other information. The occurrence network may be conditioned on known object categories, contextual information associated objects, and/or other information.

In some implementations, the occurrence network may be specified by a directed, acyclic graph having a node set and an edge set. In some implementations, object identifications and/or categories may be represented as nodes, while co-occurrence with other objects may be shown by the directed edges that may connect the nodes. Such a graphical representation may convey learned and/or known likelihoods of co-occurrence of pairs of objects. There are many ways to define a reasonable graph structure. A proposed approach may be to focus on a tree-structured topology. Note that any two directed trees with the same undirected skeleton may encode the same set of conditional assumptions, so it may be valid to choose an undirected structure and subsequently orient the edges in a way that forms a tree. The node and edge sets may be determined based on the training data using one or more of the number of image exemplars, a number of object categories, a count of the number of occurrences of a given object category in a given image exemplar, and/or other information. From this, one or more of the graph topology, local co-occurrence conditions, and/or local likelihoods of co-occurrence, may be determined.

In some implementations, estimating graph topology may comprise one or more of estimating pairwise joint distributions of object categories assuming a generic categorical distribution to allow for high flexibility, computing mutual information between the variables in question, and/or other operations. These may give rise to an estimate of the full mutual information graph whose maximum spanning tree may specify an optimal topology.

Local co-occurrence conditions may be determined by employing a smoothing scheme and/or other techniques to account for limited training data. A Dirichlet conjugate (and/or a Dirichlet conjugate prior) may be assumed to compute an estimate of an unknown parameter vector of a given distribution by minimizing a Bayes risk with respect to a mean squared error loss. The computation may incorporate a further assumption of an exponential decline of occurrences by letting a relative pseudo count follow a truncated geometric distribution whose single parameter may be set based on a simple maximum likelihood estimate.

Local image likelihoods of co-occurrence may be treated as a function composed of a global image feature with a category-specific classifier defined by the set of image exemplars, feature dimensionality, and/or other information. The global image feature may include one or more of HoG, SIFT, and/or other techniques having a requirement concerning the classifier being that it may returns scores that may be interpreted in a probabilistic sense (e.g., a calibrated SVM).

It is noted that the above description of the Bayesian network methodology for determining object categorization is provided for illustrative purposes only and is not to be considered limiting. For example, in some implementations, other suitable techniques through which objects may be identified and/or categorized may be employed.

By way of non-limiting example, objects detected and/or identified in a first image may include one or more of a first object, a second object, a third object, a fourth object, and/or other objects. A first object category may be associated with a first set of objects having one or more of a same or similar use, a same or similar disposition within an environment, a same or similar function, a same or similar shape and/or form, and/or other similarities. A second object category may be associated with a second set of objects having one or more of a same or similar use, a same or similar disposition within an environment, a same or similar function, a same or similar shape and/or form, and/or other similarities. The first object, second object, and/or other objects may have one or more similarities that match, or substantially match, those within the first set of objects associated with the first object category. The first object, the second object, and/or other objects may be classified under the first object category. The third object, fourth object, and/or other objects may have one or more similarities that match, or substantially match those within the second set of objects. The third object, the fourth object, and/or other objects may be classified under the second object category.

In some implementations, contextual information associated with the first object category may convey a likelihood of the second object co-occurring with the first object, and/or other information. If the likelihood of the second object also being present is great, then iterations of an object identification operation may be performed to identify one or more detected features as the second object. Further iterations of object identification of the second object may be halted should the second object not be identified within an image after a threshold number of iterations of object identification such that it may be determined that the second object may not be present. By way of non-limiting example, the threshold number of iterations may comprise 2, and/or other quantity.

By way of non-limiting illustration, objects detected and/or identified in an image of an office may include one or more of a tower, one or more monitors, a keyboard, a mouse, a mouse pad, a desk, a chair, and/or other objects. A first object category may comprise "desktop computer." The desktop computer category may be associated with a set of objects having one or more of a same or similar use associated with a desktop computer, a same or similar disposition in an office, a same or similar function associated with a desktop computer, a same or similar shape and/or form associated with a desktop computer, and/or other similarities. By way of non-limiting example, the set of objects included in the desktop computer category may include one or more of the tower, one or more monitors, the keyboard, the mouse, the mouse pad, and/or other objects. A second object category may comprise "office furniture." The office furniture category may be associated with a set of objects having one or more of a same or similar use associated with office furniture, a same or similar disposition in an office, a same or similar function associated with office furniture, a same or similar shape and/or form associated with office furniture, and/or other similarities. By way of non-limiting example, the set of objects included in the office furniture category may include one or more of the desk, the chair, and/or other objects.

It is noted that the above illustrative description of an office setting is provided for illustrative purposes only and is not to be considered limiting. For example, one or more of the proposed techniques described above may be applied to other image depicting other types of scenes.

Parameter values of a location parameter may comprise information associated with locations of objects detected, identified, and/or categorized within an image. A model configured to generate output comprising parameter values of a location parameter may be conditioned on outputs of one or more preceding models. By way of non-limiting example, a model configured to generate output comprising parameter values of a location parameter may be conditioned on a set of outputs from one or more preceding models that may be configured to generate output comprising parameter values of an object occurrence parameter and/or other image parameters.

A model configured to generate output comprising parameter values of a location parameter may be configured to execute one or more location determination operations. Values of a locating parameter may describe a layout of objects detected within an image. By way of non-limiting example, a layout may correspond to one or more of relative distances between objects, relative orientations between objects, and/or other information. In some implementations, a location determination operation may utilize known spatial dependencies between individual identified and/or categorized objects, and/or other information.

In some implementations, spatial dependencies between individual objects of one or more object categories may be determined from training data and/or other information. For example, one or more image exemplars may include known and/or learned object identifications, categorizations, and/or spatial dependency determinations. From the image exemplars, likely layouts of various identified objects may be determined.

By way of non-limiting example, spatial dependencies may describe a likely first layout of a first object, a second object, and/or other objects. Responsive to the first object, second object, and/or other objects being identified in an image, output from a location determination operation may return values of location parameters for the first object, second object, and/or other objects. For example, the first layout may specify a that the first object and second object are likely to be one or more of first distance from each other, orientated at a first relative orientation, and/or positioned in other ways.

By way of non-limiting illustration, the first object may comprise a computer monitor and the second object may comprise a keyboard. Information describing learned spatial dependencies may specify the first layout as one or more "the monitored being positioned above the keyboard," "the face of the keyboard being positioned perpendicular to the monitor's display," and/or other layout specifications. Values of one or more locations parameters may be comprise this information describing the learned spatial dependencies.

In some implementations, determining spatial dependencies between objects from training data may take a similar tree-structured Bayesian network approach and/or other techniques. The Bayesian network approach for spatial dependency (herein referred to as the "location network") may depend on one or both of image exemplars and/or information derived from the occurrence network described herein. For example, the location network may be dynamically adjusted with respect to the number of identified objects as well as their categories, distributions of object categories, optimal spatial dependencies, and/or other information.

In some implementations, a dynamic network topology of a location network may be constructed that may be optimal with respect to the information determine from the occurrence network. At training time, estimation of continuous mutual information between object categories may be made, including self-information and/or other information. The training data for joint entropy estimation of categories may comprise pairs of objects that may have been determined via bipartite matching between the objects, where the edge weights may be given by Euclidean distance. A matrix including mutual information between bounding box parametrizations may be generated, which may be different from closed-form mutual information in the occurrence network. Location variables may be split into active and inactive variables. A non-parametric, category occurrence-dependent topology of the location network may be constructed by computing a maximum spanning tree over the active location variables. The active location variables may represent a truncated conditional kernel density and the remaining variables may be set to uninformative states.

A density at a particular feature point may reflect a likelihood that a corresponding bounding box may contain an object of a given category in an image. Training data may convey this density by following a path similar to category-specific classifier used in the occurrence network. However, a difference may be that of accounting for the sample space by extracting and scoring bounding box features instead of global image features. A selective search proposals may be used to cover high-density regions as efficiently as possible. This may allow an approximation of likelihood over the image with a kernel density with relatively few components centered on likely object locations.

A fixed number of object location proposals may be extracted using selective search. Bounding box features may be determined, and classified with a pre-trained and calibrated multi-class classifier. This may result in a set of score vectors that may be collected in a row-normalized score matrix, e.g., herein entries in the matrix may comprise the probability that a proposed location may contain an object. To approximate likely layouts over an image, individual object location proposals may be considered as a training point whose weight with respect to a node with a category may be given by a matrix entry with a bandwidth that may be proportional to the size of a bounding box. False positive object proposals may have no negative effect, because low-scoring proposals may have low weight in the resulting density as well and may effectively allow us to better approximate the low probability regions of the likelihood.

It is noted that the above description of the Bayesian network methodology for determining spatial dependencies and/or values for location parameters is provided for illustrative purposes only and is not to be considered limiting. For example, in some implementations, other suitable techniques through which spatial dependencies and/or values of location parameters may be determined may be employed.

User input component 112 may be configured to perform one or more of effectuating presentation of user interfaces on computing platforms 118 associated with users of system 100, obtaining user selection of desired one or more image parameters to analyze within an image, obtaining other user input based on user interaction with a user interface, and/or perform other operations. In some implementations, based on the user selection of one or more image parameters, analysis component 110 may be configured to execute a limited set of the models that correspond to the user selection. In some implementations, user input component 112 may be configured to effectuate output of analysis of one or more image parameters determined by analysis component 110 on a user interface for presentation to a user.

By way of non-limiting example, responsive to the user input component 112 obtaining user selection of the second image parameter (for example, second image parameters 208 in FIG. 2) based on user interaction with a user interface, the analysis component 110 may be configured to execute the first model (for example first model 202 in FIG. 2) and the second model (for example second model 206 in FIG. 2). The user input component 110 may be configured to effectuate output of an executed limited set of models (e.g., determined by analysis component 110) on a user interface for presentation to a user (for example, first output 205 and/or second output 209 in FIG. 2). By way of non-limiting illustration, presentation of output of execution of the first model and second model may be effectuated independent from execution of the third model and/or other models.

Figure 3:
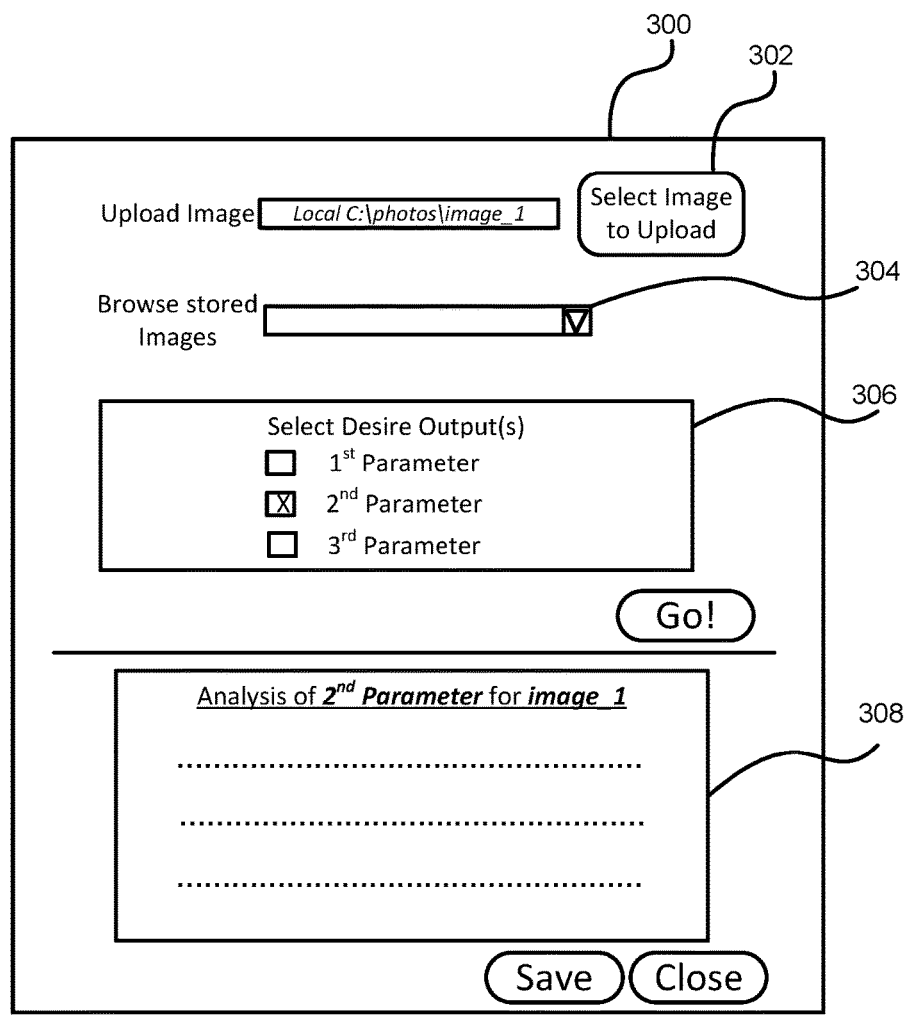
FIG. 3 illustrates an exemplary user interface, in accordance with one or more implementations.

FIG. 3 illustrates an exemplary implementation of a user interface 300 configured to receive user input. User interface 300 may be presented on a display of a computing platform. User input may comprise entry and/or selection of one or more of one or more images to analyze, one or more image parameters to analyze within one or more selected images, and/or other input.

In some implementations, user interface 300 may include one or more user interface elements and/or other components. User interface elements may comprise one or more of input elements, display elements, and/or other elements. Input elements may be configured to receive user entry and/or selection of information. Input elements may comprise one or more of buttons, search boxes, text input boxes, drop down menus, check boxes, and/or other techniques facilitating obtaining user input. Display elements may be configured to present information to users. Display elements may comprise one or more of a display areas, windows, banners, and/or other techniques to facilitate displaying information.

By way of non-limiting example, user interface 300 may include one or more of a first input element 302, a second input element 304, a third input element 306, a first display element 308, and/or other elements. The first input element 302 and/or second input element 304 may facilitate obtaining user entry and/or selection of one or more images to analyze. The first input element 302 may comprise a button and/or other user interface elements configured to direct a user to upload one or more images. For example, selection of first input element 302 may effectuate presentation of a pop-up window and/or other user interface components that may facilitate uploading images from one or more image sources. The second input element 304 may comprise a search box and/or other user interface elements. The search box may be configured to receive user selection of one or more images that may be stored on, or made accessible to (e.g., over a network), the computing platform that may display user interface 300. By way of non-limiting example, a user may select a file location of a file storing image information of an image to analyze.

Third input element 306 may be configured to receive user selection of one or more image parameters to analyze. The third input element 306 may comprise, for example, a set of check boxes and/or other user input elements. For illustration, a selection of a second image parameter is shown by virtue of the checked check box shown in user interface 300.

In some implementations, first display element 308 may comprise a results display area and/or other display elements. The first display element 308 may be configured to present output of analysis of one or more image parameters as determined by user selection via third input element 306. By way of non-limiting example, first display element 308 may display one or more of a textual listing of results (e.g., text descriptions of one or more of identified objects, determined object categories, object locations, and/or other information), a representation of an image including bounding boxes of detected objects, and/or other results information.

It is noted that the depiction and corresponding descriptions of user interface 300 in FIG. 3 is provided for illustrative purposes only and not to be considered limiting. For example, in some implementations, the user interface 300 may be configured in other ways and/or may include one or more other user interface elements.

Returning to FIG. 1, server 102, computing platform(s) 118, and/or external resources 120 may be operatively linked via one or more electronic communication links. For example, such electronic communication links may be established, at least in part, via a network 116 such as the Internet and/or other networks. It will be appreciated that this is not intended to be limiting and that the scope of this disclosure includes implementations in which server 102, computing platforms 118, and/or external resources 120 may be operatively linked via some other communication media.

The external resources 120 may include sources of information, hosts, external entities participating with system 100, and/or other resources. In some implementations, some or all of the functionality attributed herein to external resources 120 may be provided by resources included in system 100.

The server 102 may include electronic storage 115, and/or other components. The server 102 may include communication lines or ports to enable the exchange of information with network 116, computing platform(s) 118, external resource(s) 120, and/or other entities. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 115 may comprise electronic storage media that electronically stores information. The electronic storage media of electronic storage 115 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 115 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 115 may include one or more virtual storage resources (e.g., cloud storage, a virtual private network, and/or other virtual storage resources). Electronic storage 115 may store software algorithms, information determined by processor(s) 104, information received from server 102, information received from computing platforms 118, and/or other information that enables server 102 to function as described herein.

Processor(s) 104 may be configured to provide information-processing capabilities in server 102. As such, processor(s) 104 may include one or more of a physical processor, a digital processor, an analog processor, a digital circuit designed to process information, an analog circuit designed to process information, a state machine, and/or other mechanisms for processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. Processor(s) 104 may be configured to execute components 108, 110, and/or 112 of machine-readable instructions 106. Processor(s) 104 may be configured to execute components 108, 110, and/or 112 by software; hardware; firmware; some combination of software, hardware, and/or firmware; and/or other mechanisms for configuring processing capabilities on processor(s) 104.

It should be appreciated that although components 108, 110, and/or 112 are illustrated in FIG. 1 as being co-located within a single processing unit, in implementations in which processor(s) 104 includes multiple processing units, one or more of components 108, 110, and/or 112 may be located remotely from the other components. The description of the functionality provided by the different components 108, 110, and/or 112 described above is for illustrative purposes and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, 112, and/or other components. As another example, processor(s) 104 may be configured to execute one or more additional components that may perform some or all of the functionality attributed below to one of components 108, 110, and/or 112.

Figure 4:
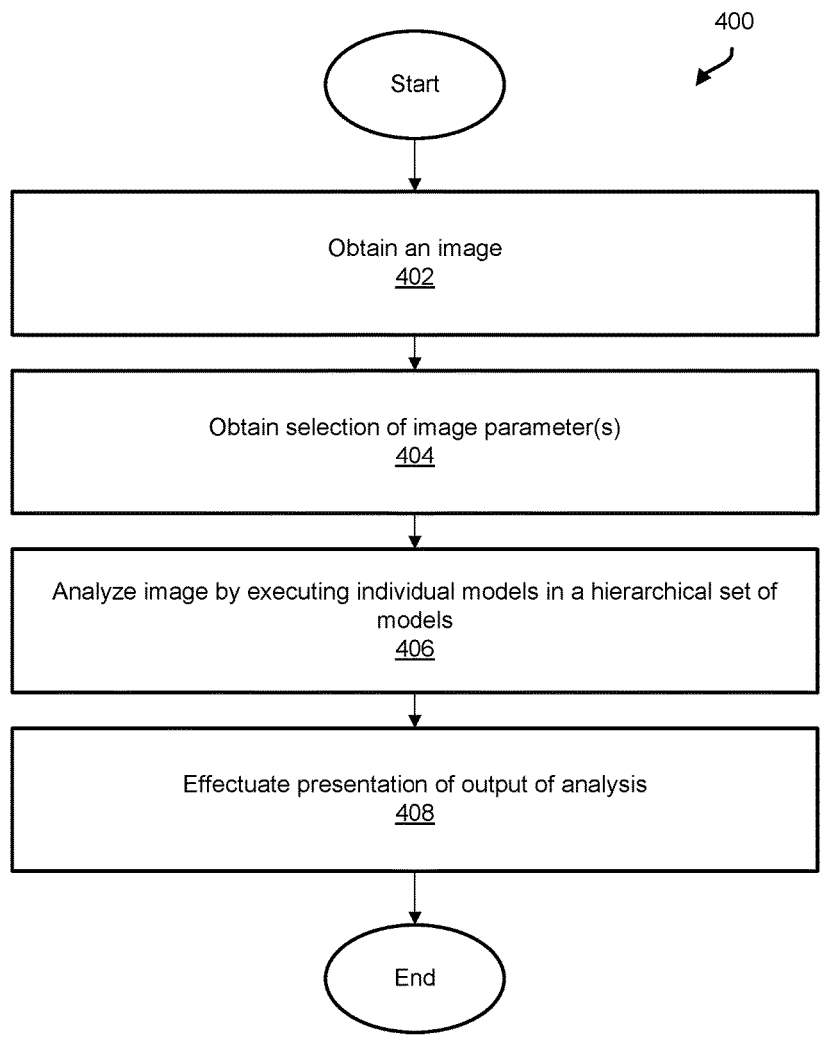
FIG. 4 illustrates a method of analyzing images using a hierarchical set of models, in accordance with one or more implementations.

FIG. 4 illustrates a method 400 of facilitating three-dimensional reconstruction of scenes from videos. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in a computer system comprising one or more of one or more processing devices (e.g., a digital processor, an analog processor, a digital circuit designed to process information, an analog circuit designed to process information, a state machine, a physical processor, and/or other mechanisms for electronically processing information). The one or more processing devices may include one or more devices executing some or all of the operations of method 400 in response to instructions stored electronically on electronic storage medium. The one or more processing devices may include one or more devices configured through hardware, firmware, and/or software to be specifically designed for execution of one or more of the operations of method 400.

At an operation 402, one or more images may be obtained. In some implementations, operation 402 may be performed by one or more physical processors executing an image component and/or user interface component the same as or similar to image component 108 and/or user interface component 112 (shown in FIG. 1 and described herein).

At an operation 404, a selection of one or more image parameters to analyze within an image may be obtained. In some implementations, operation 404 may be performed by one or more physical processors executing a user interface component the same as or similar to user interface component 110 (shown in FIG. 1 and described herein).

At an operation 406, one or more images may be analyzed by executing individual models within a hierarchical set of models. Executing individual models in the set of models may generate outputs from analysis of different image parameters of an image. Inputs of one or more of the models may be solely conditioned on set(s) of outputs derived from one or more preceding models. The set of models may include one or more of a first model, a second model, a third model, and/or other models. The first model may be configured to generate outputs from analysis of a first image parameter and/or other image parameters. The second model may be configured to generate outputs from analysis of a second image parameter and/or other image parameters. In some implementations, execution of the second model may be conditioned on outputs of the first model and/or other models. The third model may be configured to generate outputs from analysis of a third image parameter and/or other image parameters. In some implementations, execution of the third model may be conditioned on outputs of the second model and/or other models. In some implementations, generation of outputs by the first model may be independent from any outputs of the second model, third model, and/or other models. In some implementations, generation of outputs by the second model may be conditioned on outputs of the first model and/or other models. In some implementations, generation of outputs by the second model may be independent from outputs of the third model and/or other models. In some implementations, operation 406 may be performed by one or more physical processors executing an analysis component the same as or similar to the analysis component 110 (shown in FIG. 1 and described herein).

At an operation 408, output from execution of or models in the set of models may be effectuated. In some implementations, operation 408 may be performed by one or more physical processors executing a user interface component the same as or similar to the user interface component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for analyzing images using a hierarchical set of models, the system comprising:
    one or more physical processors configured by machine-readable instructions to:
        analyze an image by executing individual models in the hierarchical set of models, wherein executing the individual models in the set of models generates outputs from analysis of different image parameters of the image, wherein inputs of one or more of the models are solely conditioned on a complete set of outputs derived from a preceding model, the set of models includes:
            a first model configured to generate outputs from analysis of a first image parameter;
            a second model configured to generate outputs from analysis of a second image parameter, the execution of the second model being conditioned on outputs of the first model;
            a third model configured to generate outputs from analysis of a third image parameter, execution of the third model being conditioned on outputs of the second model;
        wherein the generation of outputs by the first model is independent from any outputs of the second model and third model; and
        wherein the generation of outputs by the second model is conditioned on outputs of the first model and is independent from outputs of the third model.

2. The system of claim 1, wherein the first image parameter is associated with features of the image, wherein output from analysis of the first parameter comprises detected features of the image.

3. The system of claim 2, wherein features include objects present in the image.

4. The system of claim 3, wherein the second image parameter is associated with object identification, and wherein output from analysis of the second parameter comprises identification of the detected objects.

5. The system of claim 4, wherein the second image parameter is further associated with object categorization, and wherein output from analysis of the second parameter further comprises object categories of identified objects.

6. The system of claim 5, wherein the one or more physical processors are further configured by machine-readable instructions to determine quantities of instances of individual object categories.

7. The system of claim 5, wherein objects are associated with contextual information.

8. The system of claim 7, wherein contextual information comprises a conditional likelihood of presence of individual objects and spatial dependencies between individual objects.

9. The system of claim 8, wherein the third image parameter is associated with locations of the one or more objects present in the image, wherein output from analysis of the third image parameter comprises locations of individual objects.

10. The system of claim 9, wherein determining locations of individual objects is based on the spatial dependences between individual objects.

11. The system of claim 1, wherein the one or more physical processors are further configured by machine-readable instructions to:
    obtain user selection of one or more image parameters to analyze within the image;
    execute a limited set of models that correspond to the user selection, such that responsive to obtaining user selection of the second image parameter, execute the first model and the second model; and
    effectuate output of executed limited set of models, such that output of execution of the first model and second model is effectuated independent from execution of the third model.

12. A method of analyzing images using a hierarchical set of models, the method being implemented in a computer system comprising one or more physical processors and storage media storing machine-readable instructions, the method comprising:
    analyzing an image by executing individual models in the hierarchical set of models, wherein executing the individual models in the set of models generates outputs from analysis of different image parameters of the image, wherein inputs of one or more of the models are solely conditioned on a complete set of outputs derived from a preceding model, the set of models includes:
        a first model configured to generate outputs from analysis of a first image parameter;
        a second model configured to generate outputs from analysis of a second image parameter, the execution of the second model being conditioned on outputs of the first model; and
        a third model configured to generate outputs from analysis of a third image parameter, execution of the third model being conditioned on outputs of the second model;
    wherein the generation of outputs by the first model is independent from any outputs of the second model and third model; and
    wherein the generation of outputs by the second model is conditioned on outputs of the first model and is independent from outputs of the third model.

13. The method of claim 12, wherein the first image parameter is associated with features of the image, wherein output from analysis of the first parameter comprises detected features of the image.

14. The method of claim 13, wherein features include objects present in the image.

15. The method of claim 14, wherein the second image parameter is associated with object identification, and wherein output from analysis of the second parameter comprises identification of the detected objects.

16. The method of claim 15, wherein the second image parameter is further associated with object categorization, and wherein output from analysis of the second parameter further comprises object categories of identified objects.

17. The method of claim 16, further comprising determining quantities of instances of individual object categories.

18. The method of claim 16, wherein objects are associated with contextual information.

19. The method of claim 18, wherein contextual information comprises a conditional likelihood of presence of individual objects and spatial dependencies between individual objects.

20. The method of claim 19, wherein the third image parameter is associated with locations of the one or more objects present in the image, wherein output from analysis of the third image parameter comprises locations of individual objects.

21. The method of claim 20, wherein determining locations of individual objects is based on the spatial dependences between individual objects.

22. The method of claim 12, further comprising:
obtaining user selection of one or more image parameters to analyze within the image;
executing a limited set of the models that correspond to the user selection, such that responsive to obtaining user selection of the second image parameter, executing the first model and the second model; and
effectuating output of executed limited set of models, such that output of execution of the first model and second model is effectuated independent from execution of the third model.

* * * * *